United States Patent Office 3,425,116
Patented Feb. 4, 1969

3,425,116
BRAZING METHOD
Donald D. Crooks, Royal W. Kelsey, and Henry T. Sumsion, San Jose, Calif., assignors, by mesne assignments, to the United States of America as represented by the Secretary of the Navy
No Drawing. Continuation-in-part of application Ser. No. 326,644, Nov. 27, 1963. This application Aug. 10, 1966, Ser. No. 571,648
U.S. Cl. 29—472.7                  6 Claims
Int. Cl. B23k 35/38, 35/12, 35/24

ABSTRACT OF THE DISCLOSURE

A process for bonding together graphite articles or graphite to ceramic or to other high temperature structural materials by brazing with an alloy selected from a group of specific binary alloys in vacuo or in a chemically inert atmosphere.

---

This application is a continuation-in-part of application Ser. No. 326,644, filed Nov. 27, 1963, now abandoned.

The present invention relates generally to the joining of graphite articles to one another or to articles of ceramic and other high temperature structural materials. More particularly, the invention involves a brazing of these articles together through the use of any number of selected binary alloys.

Ceramics, the refractory metals and their alloys, and graphite have been found to be useful as materials of construction in many high temperature applications. These materials have particular utility in the fields of missiles and hypersonic aircraft as, for example, nose cones, motor cases, leading edges of aerodynamic surfaces and control surfaces. Other important applications of these materials are to be found in the fields of nuclear reactors and electronic tube manufacture. Many of these utilizations, however, require fabrication of the desired product from components of different materials each characterized by singular and differing physical and chemical properties. It thus becomes apparent that reliable bonding techniques must be utilized in order to achieve the desired composite assembly.

Therefore, objects and features of the present invention include the provision of a material which will wet and bond graphite articles.

Another object of the present invention is to provide a composition for brazing high temperature structural materials, which brazing composition is useful in environments at elevated temperatures.

A further object of the present invention is to provide a material which will bond articles of graphite to other articles of high temperature structural materials including those comprised of graphite, ceramics and refractory metals.

Another object of the present invention is to provide a brazing technique for uniting high temperature structural materials which is both practical and economical.

Other objects, advantages and novel features of the present invention will become apparent from the following detailed description of the invention.

Heretofore the recognition that a number of materials including graphite, ceramics and the refractory metals were structurally desirable in the developing, high temperature fields of missiles and reactors was of little practical value in view of the inadequate techniques for brazing, bonding and otherwise joining these materials. It thus becomes manifest that new brazing methods and compositions must be found in order to fully utilize the beneficial chemical and physical properties of these materials in high temperature applications. Special brazing alloys have been found which will wet and bond various high temperature materials together and include bonding graphite to graphite, ceramics, oxides including beryllium oxide and zirconium oxide, carbides, nitrides, silicides and many of the more refractory metals including zirconium, titanium, molybdenum, tantalum, tungsten, rhenium, osmium and their alloys. Various combinations of these materials may also be bonded, for example, ceramics to ceramics, ceramics to metals and their alloys and metals to alloys.

The following are examples of approximate compositions produced in accordance with the present invention which have been shown to wet and bond graphite, the respective proportions being given in the percent by weight:

Titanium 90 percent; columbium 10 percent
Titanium 70 percent; vanadium 30 percent
Titanium 53 percent; chromium 47 percent
Titanium 95 percent; molybdenum 5 percent
Titanium 85 percent; tantalum 15 percent
Zirconium 80 percent; tantalum 20 percent
Titanium 68 percent; iron 32 percent
Vanadium 85 percent; beryllium 15 percent
Columbium 95 percent; beryllium 5 percent
Columbium 34 percent; chromium 66 percent
Chromium 18 percent; zirconium 82 percent
Chromium 66 percent; tantalum 34 percent
Molybdenum 95 percent; beryllium 5 percent
Molybdenum 80 percent; chromium 20 percent
Zirconium 70 percent; vanadium 30 percent
Zirconium 78 percent; columbium 22 percent These alloys exhibit a high degree of wettability and fluidity and provide a wide choice of melting points varying from approximately 900° C. to over 2000° C.

In addition to the above compositions, two groups of alloys have been found which are particularly adapted to wetting and bonding graphite to beryllium oxide, zirconium oxide and pyrographite. These alloys are 45 to 55 weight percent titanium balance zirconium and 1 to 20 weight percent beryllium balance titanium.

The disclosed percent by weight of each element comprising the various special binary alloys has been arrived at by laboratory experimentation such that only the optimum degree of wettability and fluidity of each alloy is revealed. Accordingly, a significant departure in weight percentage of any given element comprising the alloy will not produce a sufficient wetting of the surfaces to be connected.

According to the invention, graphite articles are bonded together or to ceramic articles or to other high temperature structural materials by brazing with an alloy selected from the aforementioned group of alloys in a vacuous environment or one of inert atmosphere. The selected alloy, in contact with the articles to be bonded, is heated to a temperature above its melting point in order to accomplish the desired bond, after which the assembly is allowed to furnace cool to room temperature. The choice of brazing alloy will be dictated by the specific requirements of the particular application. For example, it may be desirable in nuclear applications to substitute zirconium for titanium in the above noted alloys in order to obtain the beneficial lower neutron capture cross section of zirconium.

The alloys of this invention are readily adapted to the construction of composite assemblies of high temperature materials. These applications may include brazing beryllium oxide and other ceramic materials to leading edges and control surfaces of hypersonic aircraft and missiles, bonding and sealing fuel rods, control rods and that the objects of this invention have been accomplished in the provision of economical brazing alloys for bonding structural materials for use in environments at elevated temperatures.

Obviously many modifications and variations of the present invention are possible in the light of the above teachings. It is therefore to be understood that within the scope of the appended claims the invention may be practiced otherwise than as specifically described.

What is claimed is:

1. A method of joining graphite articles to other articles of high temperature structural materials comprising bringing an alloy selected from the group of alloys consisting by weight of about 10% columbium balance titanium, about 30% vanadium balance titanium, about 47% chromium balance titanium, about 5% molybdenum balance titanium, about 15% tantalum balance titanium, about 20% tantalum balance zirconium, about 32% iron balance titanium, about 15% beryllium balance vanadium, about 5% beryllium balance columbium, about 34% columbium balance chromium, about 18% chromium balance zirconium, about 34% tantalum balance chromium, about 5% beryllium balance molybdenum, about 20% chromium balance molybdenum, about 30% vanadium balance zirconium, about 22% columbium balance zirconium, from about 45-55% titanium balance zirconium and from about 1-20% beryllium balance titanium, in contact with said articles in an inert atmosphere;
heating said alloy to the melting point thereof; and furnace-cooling the joined articles to room temperature.

2. The method of claim 1 wherein the alloy comprises from about 45-55% by weight titanium balance zirconium.

3. The method of claim 1 wherein the alloy comprises from about 1-20% by weight beryllium balance titanium.

4. The method of claim 1 wherein said inert atmosphere comprises a vacuum.

5. The method of claim 4 wherein the alloy comprises from about 45-55% by weight titanium balance zirconium.

6. The method of claim 4 wherein the alloy comprises from about 1-20% by weight beryllium balance titanium.

References Cited

UNITED STATES PATENTS

| | | | |
|---|---|---|---|
| 2,739,375 | 3/1956 | Coxe. | |
| 2,979,813 | 4/1961 | Steinberg | 29—504 X |
| 2,979,814 | 4/1961 | Steinberg | 29—504 X |
| 3,022,162 | 2/1962 | Donnelly | 75—165 |
| 3,038,249 | 6/1962 | Gilliland | 29—504 X |
| 3,046,650 | 7/1962 | Heestand. | |
| 3,097,931 | 7/1963 | Davidson | 29—195 |
| 3,104,972 | 9/1963 | Droegkamp | 75—177 |
| 3,122,424 | 2/1964 | King | 29—195 |
| 3,177,577 | 4/1965 | Fujimura | 29—472.7 |
| 3,196,536 | 7/1965 | Knippenberg | 29—472.7 |

FOREIGN PATENTS

| | | |
|---|---|---|
| 622,550 | 6/1961 | Canada. |
| 695,470 | 10/1964 | Canada. |

JOHN F. CAMPBELL, *Primary Examiner.*

R. F. DROPKIN, *Assistant Examiner.*

U.S. Cl. X.R.

29—473.1, 494, 500, 504, 195; 287—189.365; 75—175.5, 177, 174, 150, 176